United States Patent [19]
Kohno

[11] 4,076,422
[45] Feb. 28, 1978

[54] FABRY-PEROT INTERFERENCE SPECTROMETER

[75] Inventor: Tsuguo Kohno, Tokorozawa, Japan

[73] Assignee: Agency of Industrial Science & Technology, Tokyo, Japan

[21] Appl. No.: 660,378

[22] Filed: Feb. 23, 1976

[30] Foreign Application Priority Data

Feb. 24, 1975 Japan .................... 50-22646

[51] Int. Cl.$^2$ ............................................. G01B 9/02
[52] U.S. Cl. ..................... 356/106 S; 350/163; 356/112
[58] Field of Search ............ 356/106 S, 112; 350/163, 166, 313, 316

[56] References Cited

U.S. PATENT DOCUMENTS

| 3,373,651 | 3/1968 | Mack et al. | 356/112 |
| 3,850,510 | 11/1974 | Baker | 350/286 |
| 3,853,404 | 12/1974 | Barrett | 356/106 IS |

*Primary Examiner*—Vincent P. McGraw
*Attorney, Agent, or Firm*—Kurt Kelman

[57] ABSTRACT

A reflecting mirror is disposed behind a single Fabry-Perot interferometer non-perpendicularly relative to the optical axis of the interferometer. The light transmitted through the interferometer parallelly to the optical axis is reflected by the reflecting mirror and, therefore, caused to pass reversely through the interferometer at an angle relative to the optical axis. In this way, a single interferometer offers two different mirror gaps, one for the light path in the forward transmission and the other for the light path in the reverse transmission through the interferometer. The forward and reverse transmission of the light through the interferometer at different mirror gaps serves to enlarge the free spectral range to a notable extent.

5 Claims, 10 Drawing Figures

⟶ Wave length

FABRY-PEROT INTERFERENCE SPECTROMETER

BACKGROUND OF THE INVENTION

This invention relates to the Fabry-Perot interference spectrometer. The Fabry-Perot interference spectrometer is characterized especially by high resolving power and brightness and is used particularly for spectral observation necessitating high resolution or involving extremely weak light. Since it generally has a narrow free spectral range (the range in which a spectrum can be observed without overlapping), this interference spectrometer must, however, be used in combination with a pre-dispersing element such as, for example, a diffraction grating, a prism, an interference filter or one or two additional Fabry-Perot interferometers unless it is operated with an intense monochromatic light source. When a diffraction grating or prism is used as the pre-dispersing element, the interference spectrometer provides a darkened spectrum. Incorporation of an interference filter or additional Fabry-Perot interferometer renders the manufacture of the interference spectrometer difficult and necessitates rigid control of the mirror gap during the operation.

An object of the present invention is to provide a Fabry-Perot interference spectrometer which enjoys a notably wide free spectral range without use of a pre-dispersing element.

SUMMARY OF THE INVENTION

To accomplish the object described above according to the present invention, there is provided a Fabry-Perot interference spectrometer wherein a reflecting mirror is disposed behind one Fabry-Perot interferometer aslant relative to the optical axis of the interferometer. The Fabry-Perot interference spectrometer has its free spectral range enlarged to a notable extent without the use of a pre-dispersing element when a light path parallel with the optical axis of one Fabry-Perot interferometer and another light path aslant the optical axis are established by incorporation of the reflecting mirror so that incident light is transmitted forward through the one interferometer via the parallel light path and reversely therethrough via the slanted light path. This invention enjoys another advantage in that the incorporation of the reflecting mirror into one Fabry-Perot interferometer brings about the same effect as is obtained by operating two interferometers arranged in a row, and that, since neither addition of any extra element nor special manufacture is required, the known Fabry-Perot interferometer can be utilized in its unmodified form. In terms of size, the Fabry-Perot interference spectrometer of the configuration according to this invention is much smaller than a countertype incorporating an additional interferometer as the pre-dispersing element.

The other objects and characteristics of the present invention will become apparent from the detailed description hereinafter with reference to the accompanying drawing.

Figure 1:
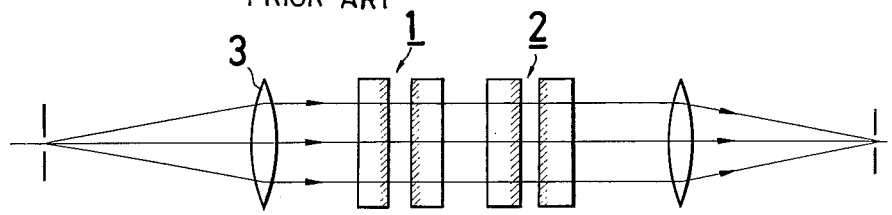
FIG. 1 is an explanatory diagram of the spectral observation to be carried out by use of a conventional system incorporating two Fabry-Perot interferometers.
Figure 2:
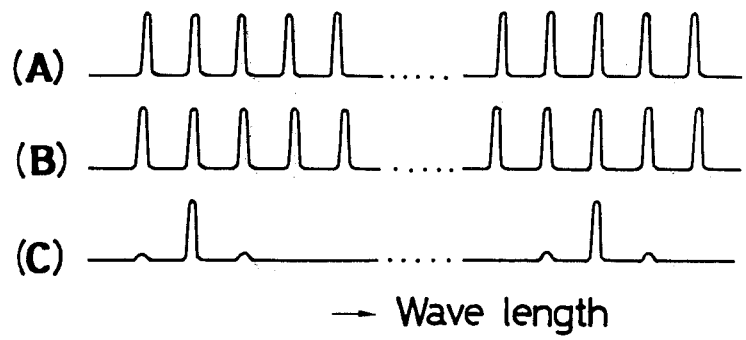
FIG. 2(A) is a diagram illustrating the spectral transmission characteristics of the first interferometer in the system of FIG. 1.
FIG. 2(B) is a diagram illustrating the spectral transmission characteristics of the second interferometer in the system of FIG. 1.
FIG. 2(C) is a diagram illustrating the combined spectral transmission characteristics of the two interferometers in the system of FIG. 1.

DETAILED DESCRIPTION OF THE INVENTION:

FIG. 1 depicts a method for conventional spectral observation utilizing a system wherein two Fabry-Perot interferometers 1 and 2 are disposed perpendicularly to a common optical axis. It is assumed that the spectral transmission characteristics of the first interferometer 1 have a shape as shown in FIG. 2(A) and those of the second interferometer 2 a shape as shown in FIG. 2(B). Then it follows that the spectral transmission characteristics of the light which has been transmitted through the two interferometers have a shape as shown in FIG. 2(C), indicating that the free spectral range is increased. This free spectral range is determined by the difference between the mirror gaps of the two Fabry-Perot interferometers and increases with the decreasing difference between the mirror gaps of the two interferometers. It is technically difficult to finely adjust the mirror gap of an interferometer and it is uneconomical to use a system having a plurality of interferometers of different mirror gaps arranged in a row.

Figure 3:
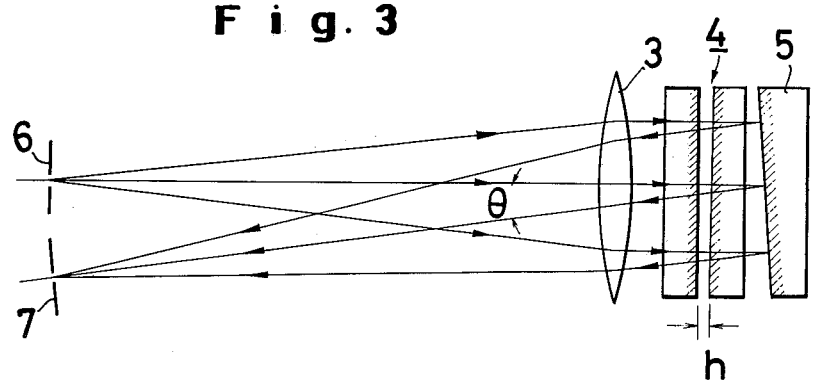
FIG. 3 is an explanatory diagram illustrating one preferred embodiment of the Fabry-Perot interference spectrometer according to the present invention.

FIG. 3 shows one preferred embodiment of the Fabry-Perot interference spectrometer according to the present invention, wherein a reflecting mirror 5 is disposed behind a single Fabry-Perot interferometer 4 non-perpendicularly to the optical axis of the interferometer. The divergent rays of light coming through an entrance slit 6 disposed on the optical axis of the interferometer are refracted by a lens 3 into parallel rays of light running parallel to the optical axis of the interferometer and are caused to impinge upon the interferometer 4. The parallel rays of light which run parallel to the optical axis of the interferometer pass through the interferometer and are reflected by the reflecting mirror at an angle $\theta$. The reflected rays of light again pass through the interferometer 4 at angle $\theta$ relative to the optical axis and they are then converged by means of the lens 3 to a point at the outlet slit 7.

Figure 4:
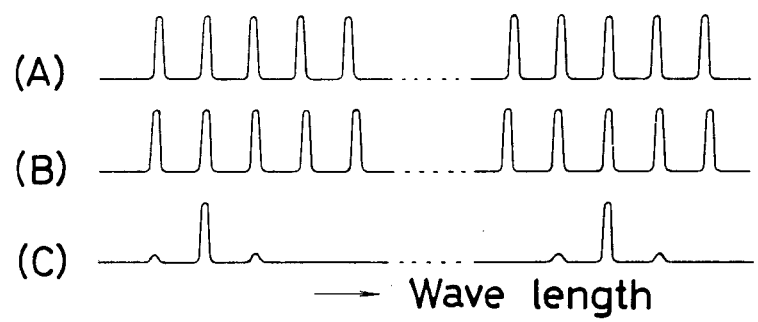
FIGS. 4(A), 4(B) and 4(C) are diagrams illustrating the spectral transmission characteristics of the interference spectrometer of FIG. 3.

The rays of light passing through the entrance slit 6 are refracted by the lens 3 into parallel rays of light travelling parallel to the optical axis of the interferometer 4 and the parallel rays of light perpendicularly pass through the Fabry-Perot interferometer 4 having a mirror gap of "$h$". The spectral transmission characteristics exhibited at this time have a shape as shown in FIG. 4(A). The parallel rays of light which have passed through the interferometer 4 are then reflected by the slanted reflecting mirror 5 so that the reflected rays of light are caused to pass through the interferometer 4 at an angle of θ from the optical axis of the interferometer 4. Since the light path for the incoming rays of light differs from that for the reflected rays of light, the spectral transmission characteristics of the reflected rays of light have a different shape as shown in FIG. 4(B). The rays of light which have passed through the interferometer 4 on the way to and again on the way from the reflecting mirror are passed through the lens 3 to the outlet slit 7. At the slit, the spectral transmission characteristics of the light have a shape as shown in FIG. 4(C). An interference filter (not illustrated) passes a single pertinent peak of wave length and stops other peaks of wave length to provide desired spectral observation of the light.

The transmission characteristics involving narrow free spectral ranges as illustrated in FIGS. 4(A) and 4(B) are at once converted to those involving a strikingly broadened free spectral range as illustrated in FIG. 4(C) by having a reflecting mirror disposed behind one Fabry-Perot interferometer non-perpendicularly to the optical axis thereof, thereby allowing the incoming rays of light to travel forward along the path parallel to the optical axis and backward along a path slanted relative to the optical axis. The reflecting mirror combined with a single Fabry-Perot interferometer thus beings about the same effect as would be obtained by using two interferometers arranged in a row.

The wave form shown in FIG. 4(C) is the product of the wave form shown in FIG. 4(A) multiplied by the wave form of FIG. 4(B) and equals what is obtained when the incoming rays of light are passed through two interferometers arranged in a row, one having a mirror gap "$h$" and the other a mirror gap "$h \cos \theta$". In the configuration of the present invention, therefore, the free spectral range may be suitably adjusted by varying the angle which the reflecting mirror 5 forms with the optical axis.

In the case of a single Fabry-Perot interference spectrometer using a Fabry-Perot interferometer of a mirror gap "$h$" of 1 mm and having a reflecting mirror disposed behind the interferometer to reflect the light at an angle "$\theta$" of 18° relative to the optical axis of the interferometer, for example, if a light having a wave length of 6000 A is passed through the interferometer, the free spectral range is 36 A, a value 20 times as large as the value 1.8 A obtainable in the absence of the reflecting mirror. When the reflecting mirror is disposed so as to form an angle (θ) of 15°, the free spectral range is increased to about 50 A.

When a light having a wave length of 3000 A is passed through an interferometer of a mirror gap "$h$" of 0.5 mm, the free spectral range is 0.9 A in the absence of the reflecting mirror and it is increased to 18 A when the reflecting mirror is slanted so as to reflect the light at an angle "$\theta$" of 18°. It is quite easy to obtain an interference filter having a wavelength path band of the order of 18 A or larger, while it is hardly feasible to obtain an interference filter having a free spectral range of 0.9 A or 1.8 A.

Figure 5:
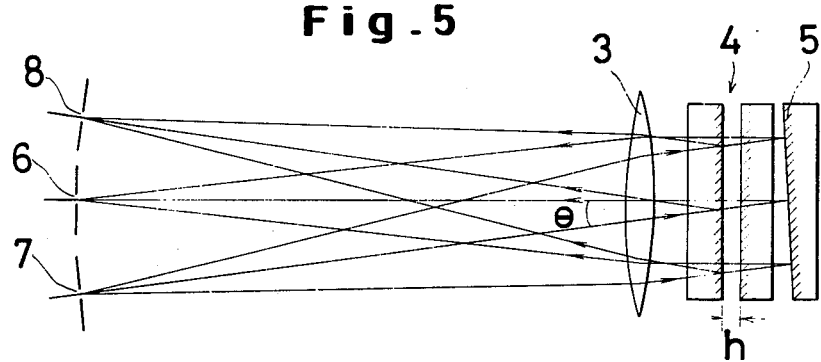
FIG. 5 and FIG. 6 are explanatory diagrams illustrating other preferred embodiments of the Fabry-Perot interference spectrometer according to the present invention.

The embodiment illustrated in FIG. 3 represents a configuration such that the rays of light coming through the entrance slit 6 reach the interferometer parallelly with the optical axis. The same results are obtained with a configuration as shown in FIG. 5 wherein the rays of light coming through the outlet slit 7 are allowed to travel first at an angle "$\theta$" relative to the optical axis and are then reflected by the reflecting mirror 5 so as to travel parallel to the optical axis and pass reversely through the interferometer 4. In this configuration, the reverse fringe observable at the position of the slit 8 can be utilized for monitoring purposes or the like.

Figure 6:
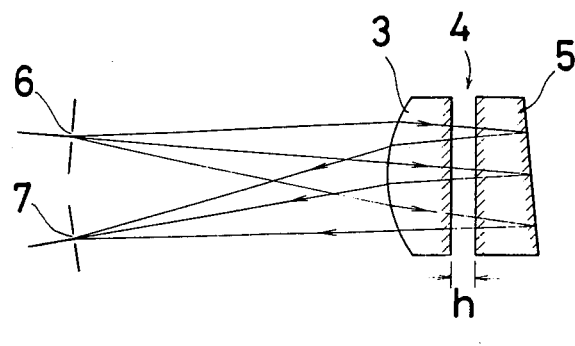

FIG. 6 illustrates another preferred embodiment of the Fabry-Perot interference spectrometer, wherein a lens 3 and one of the two component plates of a Fabry-Perot interferometer 4 are formed as one integral part and a reflecting mirror 5 and the other component plate of the interferometer 4 are formed as one integral part. In the Fabry-Perot interference spectrometer of this configuration, the rays of light coming through the entrance slit 6 are refracted by the lens 3 into parallel rays and, in that state, caused to pass through the interferometer 4. The parallel rays of light are then reflected by the reflecting mirror 5 and are therefore caused to pass again through the interferometer 4 at an angle "$\theta$" relative to the optical axis and reach the outlet slit 7 via the lens 3. This embodiment has a very simple configuration consisting of a slit and an interferometer and enjoys perfect freedom from the ghost phenomenon which would otherwise occur because of the reverse surfaces of component glass plates of the ordinary interferometer. To be more specific, in the ordinary Fabry-Perot interferometer, the light reflected on the reverse surfaces of the component glass plates of the interferometer form a false fringe which manifests itself as what is usually called a "ghost". In the preferred embodiment just described, however, the reverse surface of one of the component glass plates forms a convex surface of a lens and the reverse surface of the other component glass plate forms a reflecting mirror. This configuration therefore lacks any cause for the ghost phenomenon.

No interference filter serving to single out a pertinent peak of wave length is required, if the reflecting mirror is replaced by a reflecting interference filter or diffraction grating. Although the present preferred embodiment represents a configuration having one lens serving concurrently as a colimeter and a telescopic lens, when necessary, such individual lenses may be incorporated independently.

As is evident from the foregoing description, the present invention permits the free spectral range of a single Fabry-Perot interferometer to be expanded by 10 to 20 times without use of any additional interferometer and enables the interferometer to manifest its effects advantageously as an optical instrument of high resolving capacity.

Furthermore, the Fabry-Perot interference spectrometer according to the present invention is only required to have a reflecting mirror disposed effectively with respect to the interferometer and does not necessitate addition of an extra element or special manufacturing steps. The size of the entire system is roughly one half of the size of the system using two interferometers disposed in a row. In the conventional operation of wave length scanning by use of two Fabry-Perot interferometers, it has been necessary for the interferometers to be held in separate air-tight vessels and be maintained therein under different vapor pressures or for the mirror gaps of the interferometers to be varied suitably from each other. In the case of wave length scanning to be effected by lateral movement of the peak like the one illustrated in FIG. 2(C), for example, it has been necessary that the peak shown in FIG. 2(A) and that shown in FIG. 2(B) should be moved while they are held in alignment. Consequently it has sometimes proved necessary to incorporate a special mechanism adapted to permit such peak alignment. According to the present invention, since use of only one interferometer suffices for the wave length scanning resorting to vapor pressure or mirror gap adjustment, the two peaks are automatically aligned insofar as the angle θ is suitably fixed. Thus, wave length scanning can be carried out very stably by the system of the present invention. Furthermore, in the conventional system using two interferometers parallel with each other and perpendicular to a common optical axis, part of the passing light is reflected back and forth between the two component glass plates of each interferometer, giving rise to the ghost phenomenon. In the interference spectrometer according to the present invention, virtually no part of the passing light is reflected back and forth between the component glass plates of the single interferometer and, hence, no ghost phenomenon is involved because the number of reverse surfaces of such component glass plates is smaller and also because the forward light path or reverse light path is inclined relative to the optical axis. Thus, the Fabry-Perot interference spectrometer of this invention enjoys many advantages.

What is claimed is:

1. A single Fabry-Perot interference spectrometer, comprising an optical system including slits and a lens, a Fabry-Perot interferometer and a reflecting mirror disposed behind said Fabry-Perot interferometer non-perpendicularly to the optical axis of said interferometer, whereby a forward light path parallel to said optical axis and a reverse light path slanted relative to the optical axis are established so that the rays of light travel forward and back along said two light paths through the interferometer.

2. The Fabry-Perot interference spectrometer according to claim 1, wherein the rays of incoming light pass through said interferometer along the light path parallel to the optical axis of said interferometer and, after being reflected by the reflecting mirror, the rays of light again pass through said interferometer along the other light path slanted with respect to the optical axis.

3. The Fabry-Perot interference spectrometer according to claim 1, wherein the rays of incoming light pass through said interferometer along the light path slanted relative to the optical axis of said interferometer and, after being reflected by the reflecting mirror, the rays of light again pass through the interferometer along the other light path which is parallel to the optical axis.

4. The Fabry-Perot interference spectrometer according to claim 1, wherein one of the two component glass plates of said Fabry-Perot interferometer is integrally combined with said reflecting mirror.

5. The Fabry-Perot interference spectrometer according to claim 1, wherein one of the two component glass plates of said Fabry-Perot interferometer is integrally combined with a lens.

* * * * *